US008736910B2

(12) United States Patent
Sagan et al.

(10) Patent No.: US 8,736,910 B2
(45) Date of Patent: May 27, 2014

(54) METHOD AND DEVICE SUPERIMPOSING TWO MARKS FOR SECURING DOCUMENTS AGAINST FORGERY WITH

(75) Inventors: Zbigniew Sagan, Rueil-Malmaison Cedex (FR); Justin Picard, Rueil-Malmaison Cedex (FR); Alain Foucou, Rueil-Malmaison Cedex (FR); Jean-Pierre Massicot, Rueil-Malmaison Cedex (FR)

(73) Assignee: Advanced Track and Trace, Rueil-Malmaison (FR)

( * ) Notice: Subject to any disclaimer, the term of this patent is extended or adjusted under 35 U.S.C. 154(b) by 266 days.

(21) Appl. No.: 13/202,198

(22) PCT Filed: Feb. 18, 2010

(86) PCT No.: PCT/FR2010/000136

§ 371 (c)(1), (2), (4) Date: Oct. 19, 2011

(87) PCT Pub. No.: WO2010/094859

PCT Pub. Date: Aug. 26, 2010

(65) Prior Publication Data

US 2012/0033264 A1 Feb. 9, 2012

(30) Foreign Application Priority Data

Feb. 18, 2009 (FR) ..................................... 09 00742

(51) Int. Cl.

*H04N 1/40* (2006.01)
*G06K 9/00* (2006.01)

(52) U.S. Cl.

USPC ........... 358/3.28; 358/1.9; 358/2.1; 358/2.99; 358/1.16; 382/100

(58) Field of Classification Search

None

See application file for complete search history.

(56) References Cited

U.S. PATENT DOCUMENTS

| | | | | |
|---|---|---|---|---|
| 6,395,191 | B1 * | 5/2002 | Schell | 216/65 |
| 6,898,297 | B2 * | 5/2005 | Katsura et al. | 382/100 |
| 7,286,682 | B1 * | 10/2007 | Sharma et al. | 382/100 |
| 7,489,800 | B2 * | 2/2009 | Yamaguchi et al. | 382/100 |
| 2007/0091376 | A1 | 4/2007 | Calhoon et al. | |

FOREIGN PATENT DOCUMENTS

| | | | |
|---|---|---|---|
| FR | 2 904 130 | A1 | 1/2008 |
| WO | 99/17486 | A1 | 4/1999 |
| WO | 2008/009826 | A2 | 1/2008 |

OTHER PUBLICATIONS

International Search Report, dated Feb. 2, 2011, from corresponding PCT application.

* cited by examiner

*Primary Examiner* — Steven Kau

(74) *Attorney, Agent, or Firm* — Young & Thompson

(57) ABSTRACT

A document securization method includes:

- a first step of forming a first mark (205, 210) on a first surface of a document by utilizing a first marking element,
- a second step of forming a second mark (215) on another surface of the document or in the depth of the document by utilizing a second marking element,
- the two marks are superimposed when the document is illuminated by back-lighting and
- at least one (215) of the marks is a mark whose copy, made using marking elements identical to those utilized for forming the mark, causes an error rate, measured dot by dot, that is greater than a predefined value.

15 Claims, 9 Drawing Sheets

355

360

METHOD AND DEVICE SUPERIMPOSING TWO MARKS FOR SECURING DOCUMENTS AGAINST FORGERY WITH

This invention concerns a method and a device for securing documents against forgery. It applies, in particular, to all documents or products that are flat and, at least partially, transparent, for example made of paper, plastic, fabric or glass.

This invention proposes methods for inserting codes sensitive to copying into images, substrates and, in particular, into the watermarks of banknotes, and also for reading and extracting data from these codes.

Taking just the example of valuable documents, banknotes and tickets, e.g. transport tickets, it is known that forgers use highly sophisticated technical means to imitate these. As each new security measure is adopted, for example including metallic wires possibly bearing microwriting, adding a watermark or hologram, or inserting fibers in the paper, the forgers respond by means that simulate or reproduce the additional characteristics. In addition, the means for checking the authenticity of these documents cannot be distributed, both because of their complexity and cost and because of the security risk their distribution may pose. Indeed, by obtaining them a forger would be able to learn how they work and further improve the similarity between the authentic and false documents.

Among the means used to secure valuable documents, and to allow original valuable documents to be distinguished from copies, one of the best known and oldest is to include watermarks in the paper. The watermarks are produced during the paper's production phase and immediately form part of the paper. They therefore cannot be erased or damaged due to wear of the paper, making this an advantageous means of protection especially for banknotes, which must withstand significant wear.

There are several methods for producing watermarks. For example, in small-scale production, the watermark effect is produced as the sheet is formed by locally reducing the amount of fiber. For this purpose, a simple iron or brass wire in the desired shape is simply attached to the frame receiving the paper pulp. The cylinder mold watermark technique is the most commonly used technique for banknotes, passports and other valuable documents. This type of watermark incorporates a tonal depth corresponding to a grey-scale image and is created by raised surfaces on the surface of the cylinder that compresses the paper pulp.

In theory, the watermark is a first-level protection means, i.e. it allows the holder of the document to determine authenticity in a purely sensory way: typically, the document is placed between the eye and a light source, and an image appears by transparency as a function of the thickness or density of the paper's fibers.

Unfortunately, the techniques for producing watermarks, as well as the techniques for simulating them, have become more accessible. For example, U.S. Pat. No. 7,286,682 discloses a technique to simulate a watermark-like effect by synchronizing the printing of both sides of a document and locally varying the phase of the raster dots between the two sides of the document. Looking at the document in front of a light source, an image appears in which the brighter areas correspond to the positions where the raster dots are superimposed, and the darker areas correspond to the positions where the raster dots are offset. While this technique enables a watermark-like effect to be used at a lower cost and for smaller quantities of documents (the generated image can even be varied with every print), which appears advantageous for the production of secure documents, it can also benefit forgers, who have an inexpensive method of simulating a watermark. Indeed, most holders of security documents will not be able to tell the difference between several images generated by transmitted light, whether these images are produced by conventional watermarks, synchronized printing with local variation of phase, or by other methods simulating this effect.

The widespread use of techniques for producing or simulating watermarks reduces their security. To increase the security of documents that have a watermark, different methods have been proposed for inserting machine-readable information into the watermark, in particular by modulating the local density or thickness of the paper's fibers.

The aim of the present invention is to remedy these drawbacks.

To this end, according to a first aspect, the present invention envisages a method for securing a document, characterized in that it comprises:

- a first step of forming a first mark on a first surface of said document by utilizing a first marking means,
- a second step of forming a second mark on another surface of said document or in the depth of said document by utilizing a second marking means,
- the two marks are superimposed and
- at least one of said marks is a mark whose copy, made using marking means identical to those utilized for forming said mark, causes an error rate, measured dot by dot, that is greater than a predefined value.

According to a second aspect, the present invention envisages a method for securing a document, characterized in that it comprises:

- a first step of forming a first mark, representative of a first matrix of dots, on a first surface of said document by utilizing a first marking means,
- a second step of forming a second mark, representative of a second matrix of dots, on another surface of said document or in the depth of said document by utilizing a second marking means,
- the two marks are superimposed and
- at least one of said marks presents, as a result of ad-hoc unpredictable physical phenomena of its marking means, a rate of ad-hoc errors that is greater than a predefined value.

Thanks to each of these provisions, the error rate in a back-lit image of the superimposed marks combines the features of the two marks with those of the unpredictable errors generated by their marking. In this way the ability to detect copies of each mark of the document is increased.

According to particular features, the method that is the subject of the present invention comprises a step of estimating the error probability of an area, colored or not, of at least one mark being confused with an area, not colored or colored with a different color, according to a marking parameter value utilized by the marking means and a step of selecting a parameter value corresponding to a probability comprised between two predefined values.

According to particular features, the predefined values surround the value of 22%.

Thanks to these provisions, the anti-copy capacity of at least one of said marks is improved, even optimized.

According to particular features, at least one of the marks bears an identifier of the document, in a coded way, with redundancies.

Such a mark allows the document to be identified quickly by reading its identifying code.

According to particular features, the marks have complementary colors.

Thanks to these provisions, the original seen by transparency comprises black areas whereas a copy in which the marks are less well superimposed will present colored areas.

According to particular features, at least one of the marks comprises hatched cells. The hatchings thus present a higher resolution to the cells and allow information to be carried with a lower resolution, allowing reading with a less expensive reader since it only has to read the cells, not the hatchings.

According to particular features, each colored element of one of the marks is superimposed on an absence of marking in the other mark, with the exception of elements that present an absence of marking in both marks and represent a coded message.

In this way a message or an identifier can be encoded, for example by the position of absences of marking.

According to particular features, the marks are formed of a matrix of rectangular areas; when seen by transparency one of the marks is formed of colored areas that are superimposed on the centers of uncolored areas in the other mark.

The offset of the colored areas in relation to the centers, in a copy, allows this copy to be detected.

According to a third aspect, the present invention envisages a device for securing a document, characterized in that it comprises:

- a first means for marking a first mark on a first surface of said document,
- a second means of marking a second mark on another surface of said document or in the depth of said document,
- said marking means are designed such that the two marks are superimposed and
- at least one of said marking means is designed to form a mark whose copy, made using identical marking means, causes an error rate, measured dot by dot, that is greater than a predefined value.

According to a fourth aspect, the present invention envisages a device for securing a document, characterized in that it comprises:

- a first means for marking a first mark, representative of a first matrix of dots, on a first surface of said document,
- a second means of marking a second mark, representative of a second matrix of dots, on another surface of said document or in the depth of said document,
- said marking means are designed such that the two marks are superimposed and
- at least one of said marking means is designed such that at least one of said mark presents, as a result of ad-hoc unpredictable physical phenomena of its marking means, a rate of ad-hoc errors that is greater than a predefined value.

According to a fifth aspect, the present invention envisages a computer program that can be loaded into a computer system, said program containing instructions enabling the method that is the subject of the present invention, as described in brief above, to be utilized.

According to a sixth aspect, the present invention envisages a data carrier that can be read by a computer or microprocessor, removable or not, holding the instructions of a computer program, characterized in that it allows the method that is the subject of the present invention, as described in brief above, to be utilized.

According to a seventh aspect, the present invention envisages a document comprising:

- a first mark on a first surface of the document and
- a second mark on another surface of the document or in the depth of the document, superimposed on the first mark, at least one of said marks being a mark whose copy, made using marking means with the same resolution, causes an error rate, measured dot by dot, that is greater than a predefined value.

According to an eighth aspect, the present invention envisages a document comprising:

- a first mark on a first surface of the document and
- a second mark on another surface of the document or in the depth of the document, superimposed on the first mark, at least one of said marks presenting, as a result of ad-hoc unpredictable physical phenomena of the marking means that formed it, a rate of ad-hoc errors that is greater than a predefined value.

As the particular features, advantages and aims of the method that is the subject of the second aspect of the invention, the devices that are the subjects of the third and fourth aspects of the invention, this computer program, this carrier and this document are similar to those of the securization method that is the subject of the first aspect of the present invention, as briefly described above, they are not repeated here.

Other advantages, aims and characteristics of this invention will become apparent from the description that will follow, made, as an example that is in no way limiting, with reference to the drawings included in an appendix, in which:

FIG. 1 represents, schematically and enlarged, a print on a first surface of a first document, seen through the document, FIG. 2 represents, schematically and enlarged, a watermark of the first document shown in FIG. 1, seen in transparency, FIG. 3 represents, schematically and enlarged, a print on a second surface of the first document shown in FIGS. 1 and 2, in direct view, FIG. 4 represents, schematically and enlarged, the superimposition of the prints of FIGS. 1 and 3 and the watermark of FIG. 2, when the first document is seen by transparency, with back-lighting, according to a first embodiment, FIG. 5 represents, schematically and enlarged, a print on a first surface of a second document, seen through the document, FIG. 6 represents, schematically and enlarged, a watermark of the second document shown in FIG. 5, seen in transparency, FIG. 7 represents, schematically and enlarged, a print on a second surface of the second document shown in FIGS. 5 and 6, in direct view, FIG. 8 represents, schematically and enlarged, the superimposition of the prints of FIGS. 5 and 7 and the watermark of FIG. 6, when the second document is seen by transparency, with back-lighting, according to a second embodiment, FIG. 9 represents, partially, the two surfaces of a third document, according to a third embodiment, FIG. 10 represents, partially, the two surfaces of a fourth document, according to a fourth embodiment, FIG. 11 represents, partially, the two surfaces of a fifth document, according to a fifth embodiment, FIGS. 12 and 13 represent, partially, the two surfaces of a sixth document, according to a sixth embodiment, FIGS. 14 and 15 represent, partially, the two surfaces of a seventh document, according to a seventh embodiment, FIGS. 16 and 17 represent, partially, the two surfaces of an eighth document, according to an eighth embodiment, FIG. 18 represents, schematically, a watermark and FIGS. 19 to 21 represent, schematically, changes to the watermark of FIG. 18, according to ninth to eleventh embodiments.

Throughout the description, the prints and watermarks are shown in black on a white background. However, the watermarks always present a low contrast level and the prints can be gray on a white background or in color on a background of another color.

Preferably, the watermark 115 presents, as a result of ad-hoc unpredictable physical phenomena of its marking means, a rate of ad-hoc errors that is greater than a predefined value, for example twenty percent.

Figure 1:
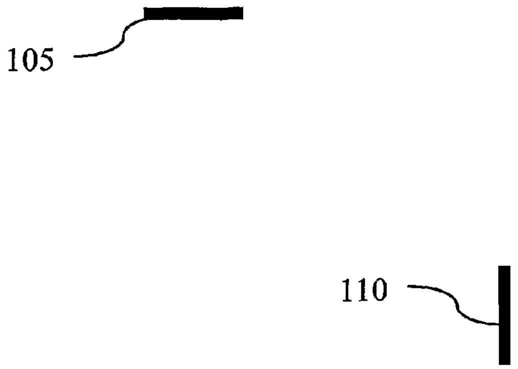
FIG. 1 shows a print on a first surface, seen in transparency through the first document, for example by back-lighting, that comprises a horizontal straight line segment 105 and a vertical straight line segment 110.
Figure 2:
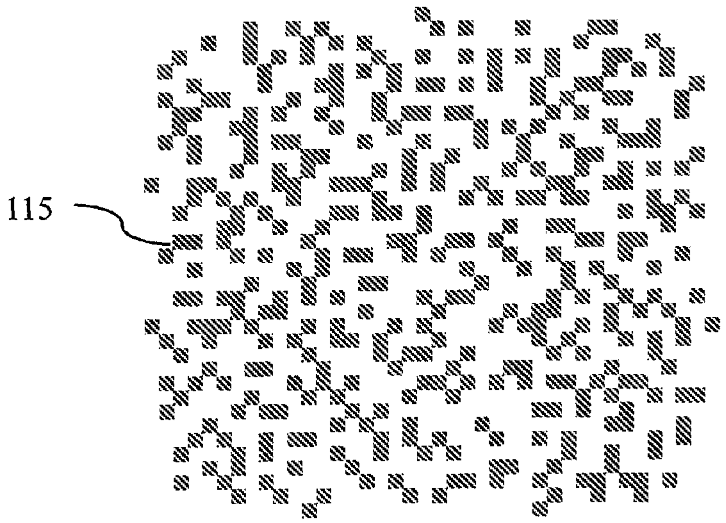
FIG. 2 shows a watermark 115, seen in transparency through the first document, for example by back-lighting, that is a mark whose copy, made using marking means identical to those utilized for forming said watermark 115, causes an error rate, measured dot by dot, that is greater than a predefined value, for example thirty percent.
Figure 3:
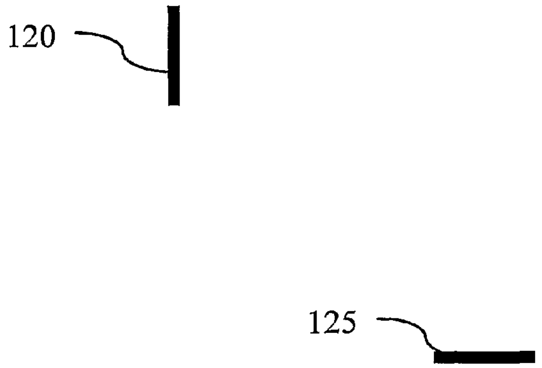

FIG. 3 shows, in a direct view of the first document, a print on a second surface that comprises a horizontal straight line segment 125 and a vertical straight line segment 120.

Figure 4:
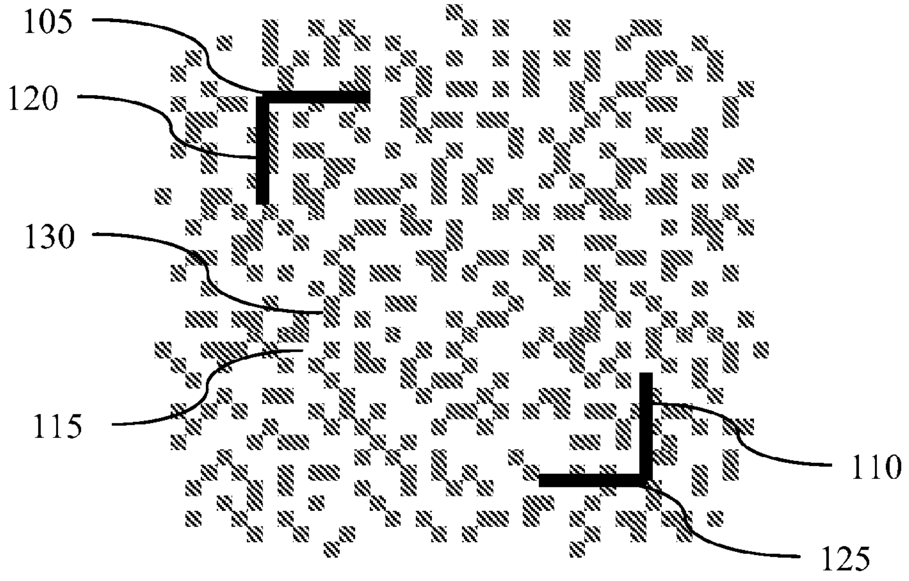

FIG. 4, shows that the two prints 105, 110, 120 and 125, seen in transparency, for example by back-lighting, form two corners of a rectangle; this rectangle delimits, in the watermark 115, an area of interest in which a message is encoded, according to known techniques. Preferably, the portion of the watermark 115 outside the rectangle delimited by the lines bearing segments 105, 110, 120 and 125, bears a second message. Each of the messages in question represents an identifier of the first document, e.g. a serial number, and possibly its model, its place of manufacture and its date of manufacture.

As is easily understood, a forger or counterfeiter who could not align the two surfaces' prints and the watermark correctly, would not be able to produce a document bearing a recognizable message allowing the document to be identified or authenticated.

Figure 5:
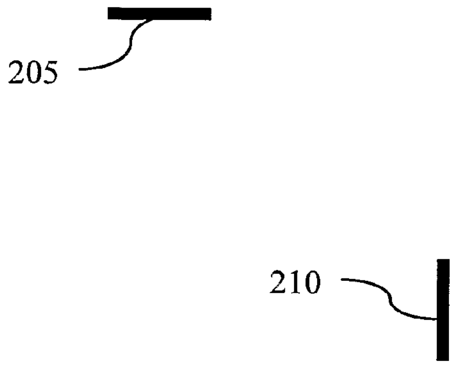

FIG. 5 shows a print on a first surface, seen in transparency through the second document, for example by back-lighting, that comprises a horizontal straight line segment 205 and a vertical straight line segment 210.

Figure 6:
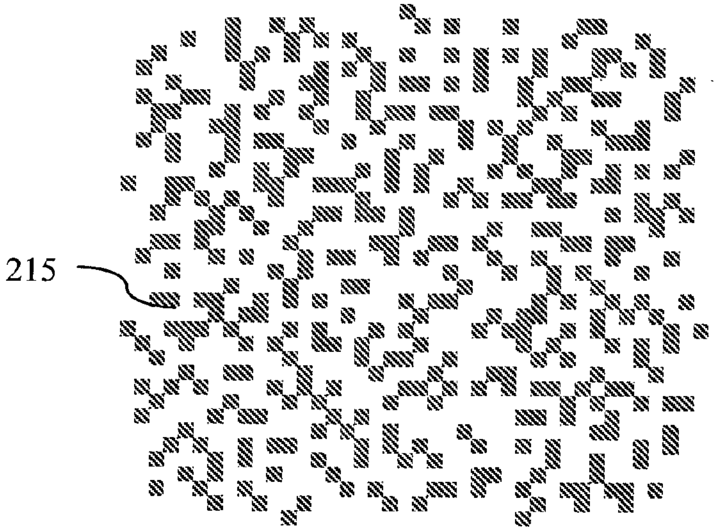

FIG. 6 shows, seen in transparency through the second document, for example by back-lighting, a watermark 215 that is a mark whose copy, made using marking means identical to those utilized for forming said watermark 215, causes an error rate, measured dot by dot, that is greater than a predefined value, for example thirty percent.

Preferably, the watermark 215 presents, as a result of ad-hoc unpredictable physical phenomena of its marking means, a rate of ad-hoc errors that is greater than a predefined value, for example twenty percent.

Figure 7:
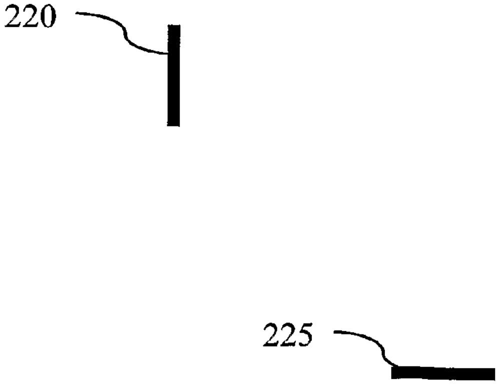

FIG. 7 shows, in a direct view of the second document, a print on a second surface that comprises a horizontal straight line segment 225 and a vertical straight line segment 220.

Figure 8:
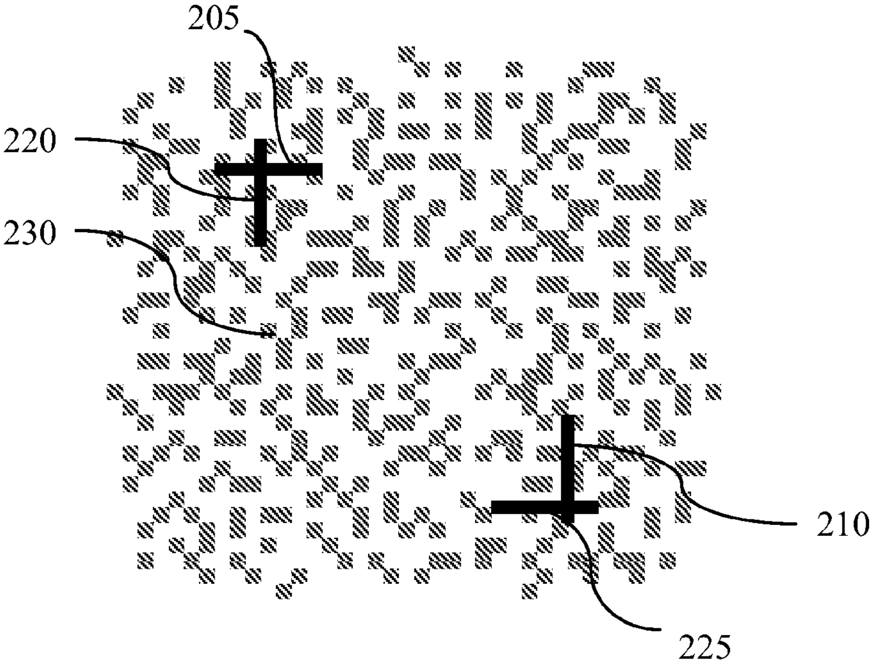

FIG. 8, shows that the two prints 205, 210, 220 and 225, seen in transparency, for example by back-lighting, form two corners of a rectangle; this rectangle delimits, in the watermark 215, an area of interest in which a message is encoded, according to known techniques. Preferably, the portion of the watermark 215 outside the rectangle delimited by the lines bearing segments 205, 210, 220 and 225, bears a second message. Each of the messages in question represents an identifier of the first document, e.g. a serial number, and possibly its model, its place of manufacture and its date of manufacture.

As is easily understood, a forger or counterfeiter who could not align the two surfaces' prints and the watermark correctly, would not be able to produce a document bearing a recognizable message allowing the document to be identified or authenticated.

Comparing FIGS. 4 and 8 it is noted that, in FIG. 4, the two prints 105, 110, 120 and 125 form parts of the rectangle they delimit, whereas, in FIG. 8, the two prints 205, 210, 220 and 225 are, at least partially, outside the rectangle they delimit. Forging the second document, shown in FIGS. 5 to 8, is therefore even more difficult than the first document, shown in FIGS. 1 to 4.

Figure 9:
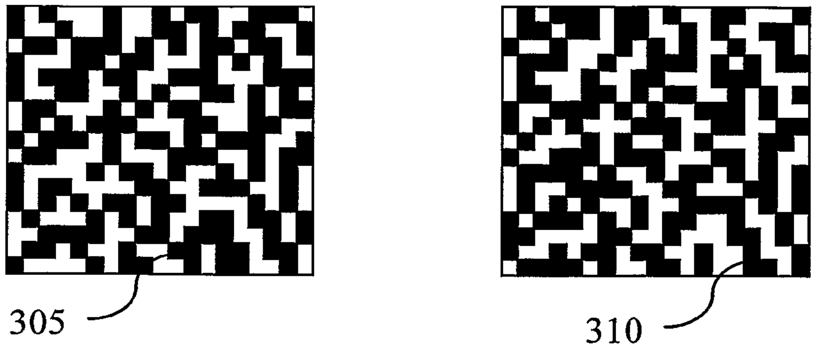

FIG. 9 shows two prints formed on two surfaces of a third document, one of the prints being seen in transparency. It is noted that print 305 is the negative of print 310. Each of prints 305 and 310 is a mark whose copy, made using marking means identical to those utilized for forming said print, causes an error rate, measured dot by dot, that is greater than a predefined value, for example twenty-five percent.

Preferably, each of these prints 305 and 310 presents, as a result of ad-hoc unpredictable physical phenomena of its marking means, a rate of ad-hoc errors that is greater than a predefined value, for example fifteen percent.

At least one of prints 305 and 310 bears an identifier of the third document, in a coded way, with redundancies (preferably error correction codes, or "CRC" for "cyclic redundancy check").

Thus, a forger would not be able to reproduce such prints 305 and 310. Moreover, even if these prints 305 and 310 were reproduced with sufficient quality, a lack of superimposition would cause, by transparency, the appearance of bright areas on a black background. The detection of a forgery of the third document is thus particularly easy.

In a variant, the two prints are identical, once one of the two is seen in transparency, i.e. each element of one is superimposed on an element of the other, but they have complementary colors; in this case the original, seen by transparency, seems formed of black dots on a white background, whereas the copy will present colored areas.

Figure 11:
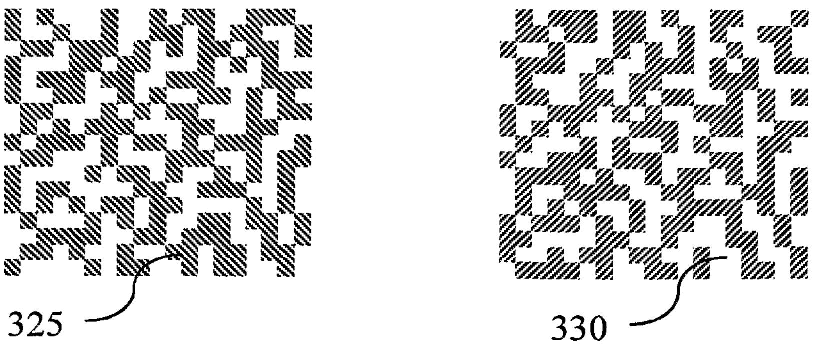

FIG. 11 shows a variant in which the elementary cells of at least one of the anti-copy marks 325 and 330 are gray or hatched.

Figure 10:
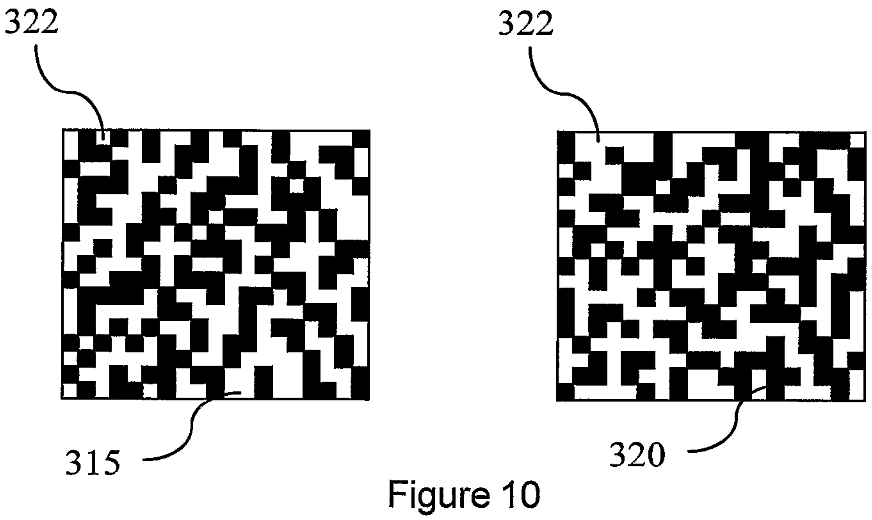

FIG. 10 shows two prints formed on two surfaces of a fourth document, one of the prints being seen in transparency. It is noted that print 315 is the negative of print 320 with the exception of dots 322, which remain transparent in both prints and represent, in a coded way, an identifier of the fourth document. In this way, each element of one of the marks is superimposed on an absence of marking in the other mark, with the exception of elements that present an absence of marking in both marks and represent a coded message, for example by their positions in marks 315 and 320.

Each of prints 315 and 320 is a mark whose copy, made using marking means identical to those utilized for forming said print, causes an error rate, measured dot by dot, that is greater than a predefined value, for example twenty-five percent.

Preferably, each of these prints 315 and 320 presents, as a result of ad-hoc unpredictable physical phenomena of its marking means, a rate of ad-hoc errors that is greater than a predefined value, for example fifteen percent.

At least one of prints 315 and 320 bears an identifier of the fourth document, in a coded way, with redundancies (cyclic redundancy checks, or "CRC").

Thus, a forger would not be able to reproduce either one of prints 315 and 320. Moreover, even if these prints were reproduced with sufficient quality, a lack of superimposition would cause, by transparency, the disappearance of the message borne by the transparent areas common to both prints and the appearance of bright areas on a black background. The detection of a forgery of the fourth document is thus very easy.

Figure 12:
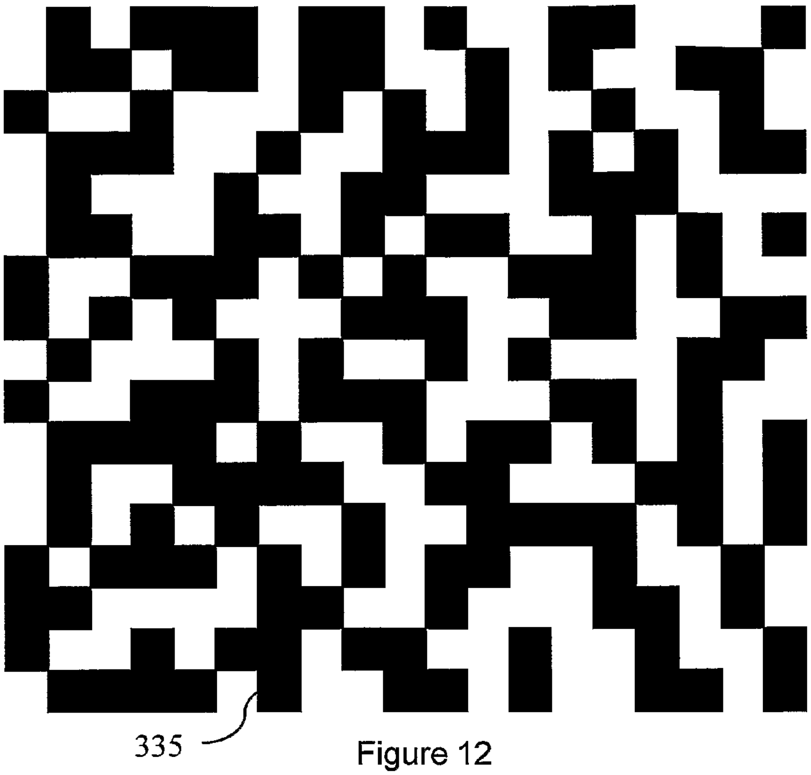
Figure 13:
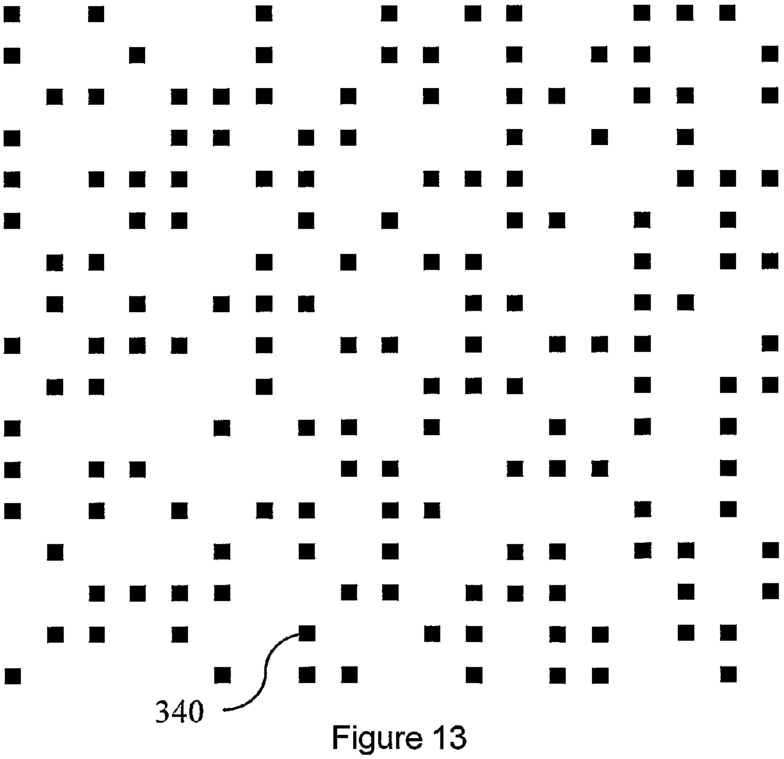

FIGS. 12 and 13 show the case in which one, 340, of the prints, when seen by transparency, is formed of dark dots that are superimposed on the centers of bright areas in the other print 335. More generally, in embodiments, the marks are formed of a matrix of rectangular areas, one of the marks, when seen by transparency, being formed of colored areas that are superimposed on the centers of uncolored areas in the other mark.

Figure 14:
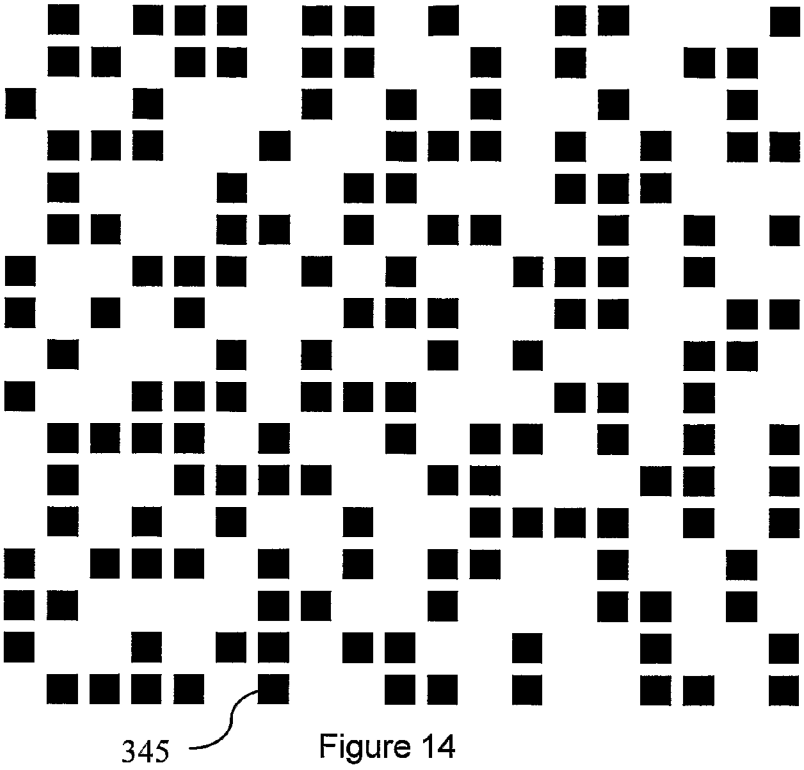
Figure 15:
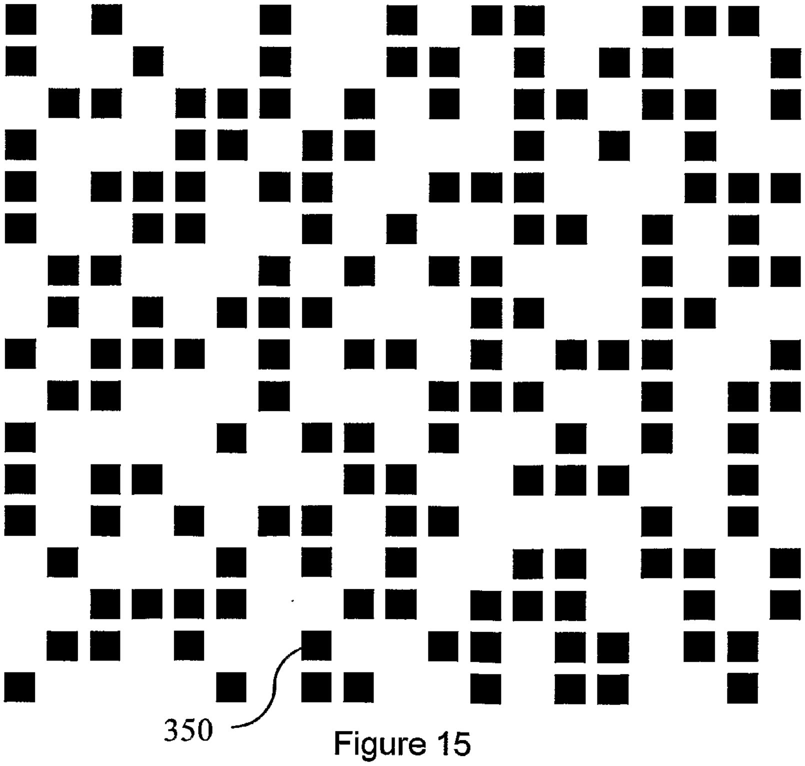

FIGS. 14 and 15 show the case in which each of prints 345 and 350, when one of the prints is seen by transparency, are formed of dark areas that are superimposed on bright areas in the other print.

Figure 16:
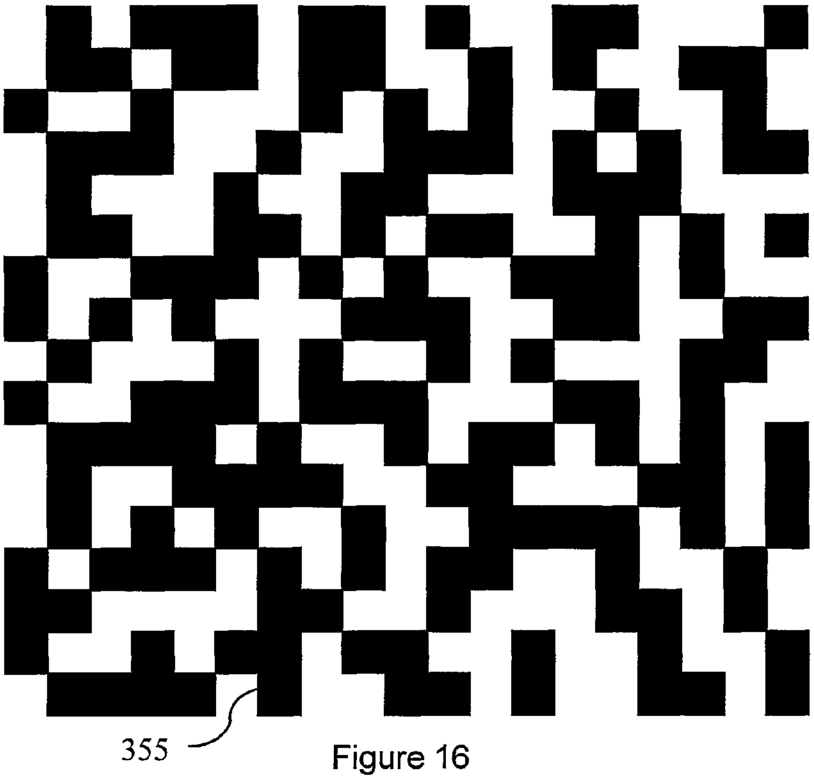
Figure 17:
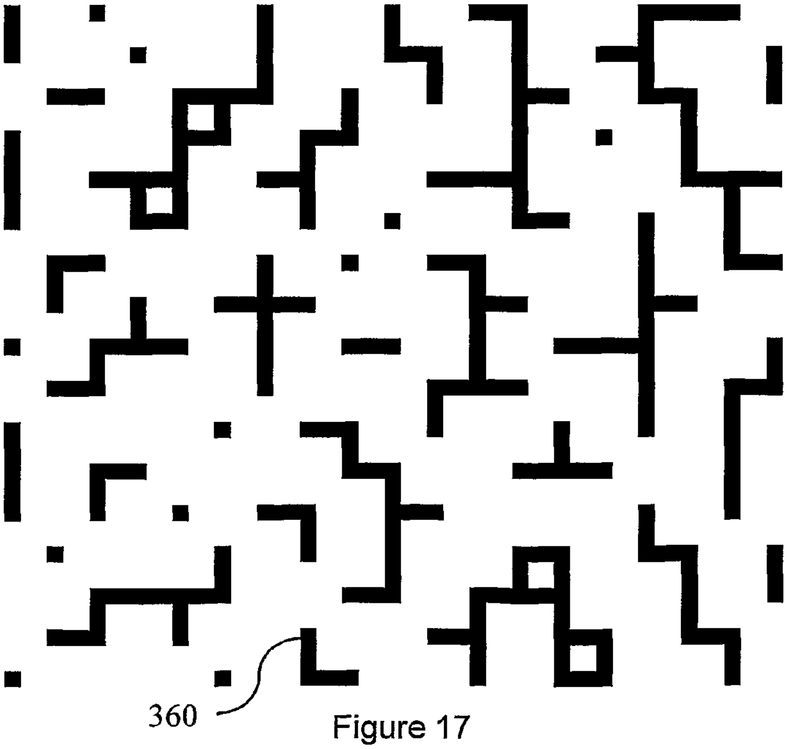

FIGS. 16 and 17 show the case in which one, 360, of the prints, when seen by transparency, is formed of dark lines that are superimposed on straight lines formed between the centers of juxtaposed bright areas in the other print 355.

Each of the prints shown in FIGS. 12 to 17 is a mark whose copy, made using marking means identical to those utilized for forming said print, causes an error rate, measured dot by dot, that is greater than a predefined value, for example twenty-five percent. Preferably, each of these prints presents, as a result of ad-hoc unpredictable physical phenomena of its marking means, a rate of ad-hoc errors that is greater than a predefined value, for example fifteen percent. Preferably, at least one of the prints is a digital authenticating code.

Digital authentication codes, also called "DAC" below, are digital images that, once marked on a medium, for example by printing or local modification of the medium, are designed so that some of their characteristics, generally automatically measurable from a captured image, are modified if a marked image is copied. Digital authentication codes are generally based on the degradation of one or more signals sensitive to copying during the copy step, a signal being borne by image elements with measurable characteristics sensitive to copying. Certain types of digital authentication codes can also contain an item of information allowing the document containing it to be identified or tracked.

There are several types of digital authentication codes, including those described below.

Copy detection patterns, also called "CDP" below, are dense images, generally of a pseudo-random nature. Their reading principle is based on an image comparison in order to measure an index of similarity (or dissimilarity) between the original copy detection pattern and the copy detection pattern captured, for example by an image sensor: if this captured image is a copy it will have a lower index of similarity than if it is an original.

Like two-dimensional bar codes, secured information matrices, also called "SIM" below, are images designed to carry a large quantity of information in a robust way. However, unlike two-dimensional bar codes, secured information matrices are sensitive to copying. On reading, an error rate is measured for the coded message extracted from the matrix, a rate that is higher for the copies than the originals, which allows these copies to be distinguished from original prints.

Unless marked in a special way, for example with invisible ink, the copy detection patterns and secured information matrices are visible. In addition, marking the copy detection patterns and secured information matrices in an invisible way is not always possible, due to cost or manufacturing constraints. The visibility of an anti-copying mark can be a disadvantage in terms of aesthetics and, in certain cases, security since the counterfeiter is informed of their presence.

There are also digital authentication codes that are naturally invisible or at least difficult to see.

For example, some digital marks (known under the name "watermarks") integrated into printed images are designed so as to be damaged when the printed image is reproduced, for example by photocopying. The measurement of the digital watermark's degree of deterioration, lower in the original print than in a copy of it, makes it possible to detect these copies.

The combination of several watermarks with different degrees of sensitivity to copying makes it possible, by comparing the respective energy levels, to detect the copies. Integrating digital watermarks into the production processes of documents is, however, more complex, which limits their use: in effect, unlike copy detection patterns and secured information matrices, the digital watermark cannot be simply "added" to the image; the digital watermark is, in fact, a complex function of the message to be added and of the original image, the digital watermark's energy being locally adjusted according to the original image's masking properties.

Integrating digital watermarks in documents or products entails sending the source image to a marking/printing central processing unit that integrates the digital watermark and sends back a marked image. This procedure is not very practical, because of the often large size of the files and related image security problems. In contrast, for marking/printing with a copy detection pattern or secured information matrix, the source image does not have to be sent to the marking/printing central processing unit: conversely, it is the image of the copy detection pattern or secured information matrix, generally of a small size, for example several kilobytes, that is sent to the holder of the image files that will be affixed onto the document or product.

In addition, it is very difficult to stabilize the reading of digital watermarks, which makes the determination of the copy from the original of a document more random. In effect, the risks of error are generally noticeably higher with digital watermarks than with copy detection patterns and secured information matrices.

There are also methods of asymmetric modulation spatial marking, also called "AMSM" below, such as those described in documents WO 2006 087351 and CH 694 233. Just like digital watermarks, AMSMs allow documents to be marked invisibly, or at least unobtrusively. AMSMs are generally patterns of dots, which are added as an additional layer to the document to be marked. For example, in the case of an offset print process, an additional plate bearing only the AMSMs is overprinted on the document. In this way, the AMSMs are more easily integrated than digital watermarks into the document production process, the source image not being required by the marking/printing central processing unit.

An aim of this invention is to propose methods making it possible to produce watermarks that are extremely difficult, or even impossible, to copy. In particular, methods are described for integrating DACs in the form of watermarks into the documents, and for reading these DACs.

A particular embodiment is described below.

Figure 18:
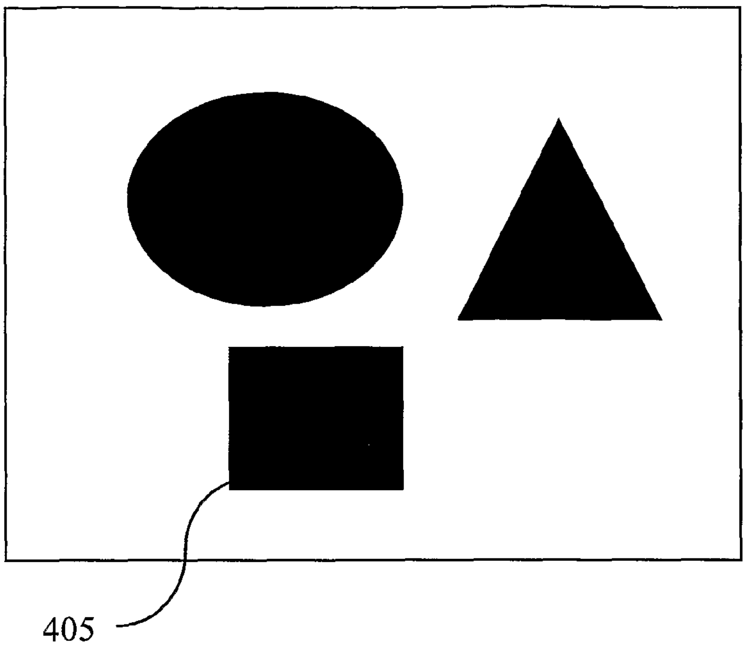
Figure 19:
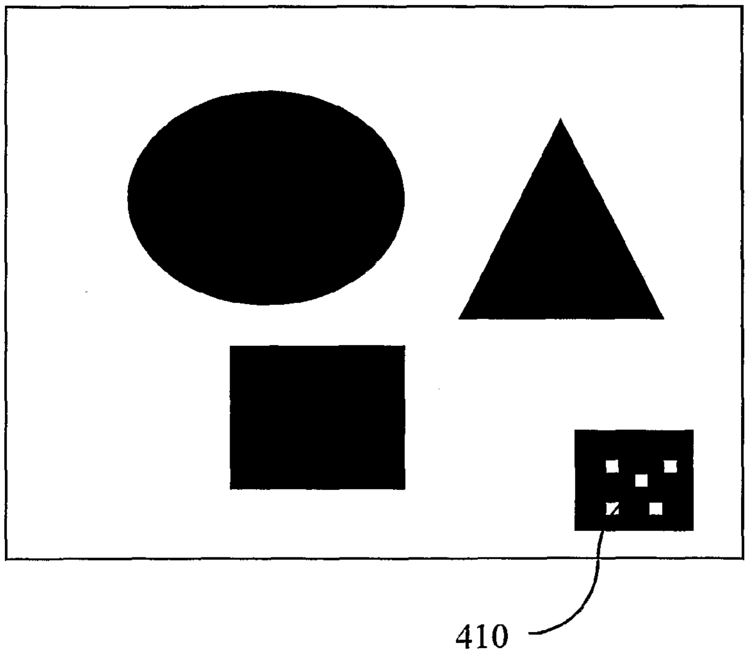
Figure 20:
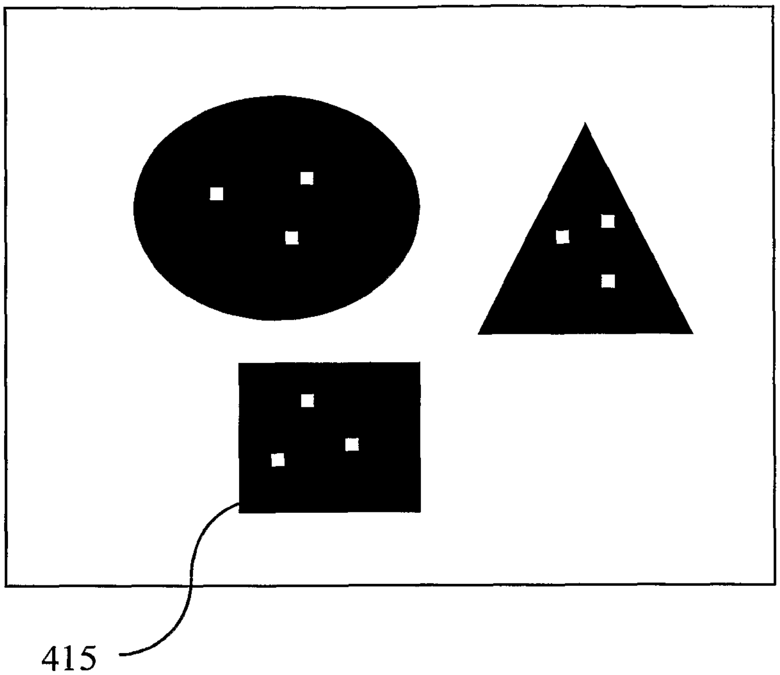
Figure 21:
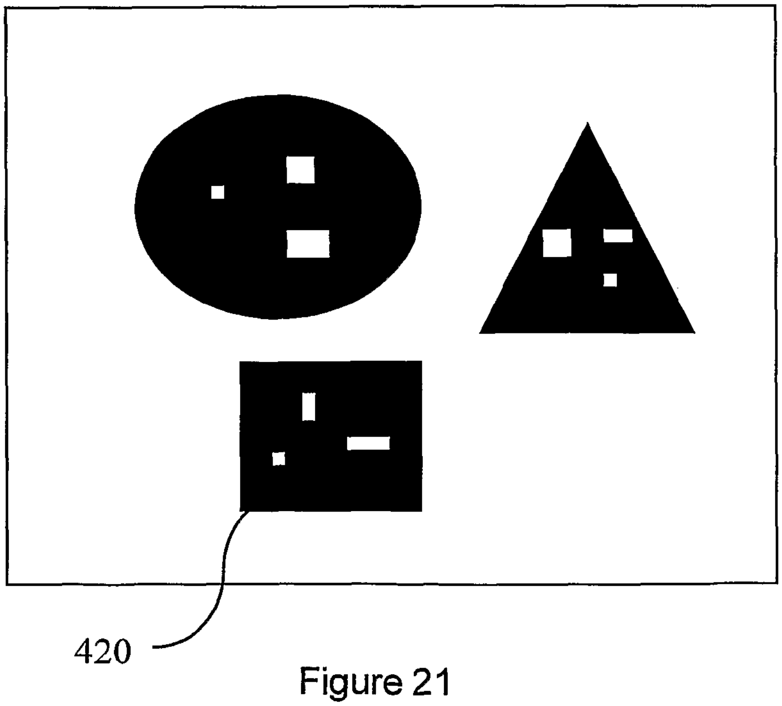

At the beginning of the watermark, a figurative image is received in shades of gray or in binary values. We assume that this image is digitized to be usable with image processing software. For the purposes of illustration, a watermark 405 in binary values is shown in FIG. 18. The DAC is associated to the figurative image in several possible ways. Non-exhaustively:

- the DAC is a "dense" SIM or a CDP 410 is inserted separately into the image, without being integrated within it, as shown in FIG. 19,
- the DAC is a "digital watermark" or an AMSM 415 is integrated into the image, as shown in FIG. 20,
- the DAC is a not very dense SIM 420 that is integrated into the figurative image by modulating the value of coded areas, either at the level of their size, as shown in FIG. 21, or at the level of their depth.

As described in PCT FR 2007/001246, a certain error rate, between certain limits, is aimed at in reading the watermark integrated into the paper. It is noted that this error rate is assumed to be for a "perfect" reading, and is generally less than the error rate obtained for reading in production, for example in the case of watermarks with transmitted light.

Indeed, the fact that determined forgers are able to obtain an accurate measurement of the watermark, the thickness and/or density of the paper, for example by using an electron microscope, must be envisaged. In that case, codes that are inherently sensitive to copying are utilized. That is to say that the degradation of the code's values occurs automatically and naturally in the process producing the copy.

To determine the possible values of the code leading to a degradation, first of all a test watermark is generated, using a figurative image or not, and a plurality of zones are included in it, each having a predefined size and/or a predefined depth. A certain quantity of paper is manufactured using this watermark, and then the mean and variability of the thickness or density of paper fiber are measured for each of the predefined areas. It may be easier to measure the grey-scale of the area illuminated by transparency, which will be higher (the area becomes brighter) if the thickness or density of paper fiber decreases.

Consider the case of two possible values of area size or depth. The probability of error of an area having a predefined size and depth being confused with another area having a predefined size and/or depth is then estimated. The pairs of values that give probabilities of confusion close to the optimum of about 22% are retained, as are all those between predefined limits, for example 5 to 40% or, preferably, 10 to 35% and even more preferably, 15 to 30%.

Thus, a step is performed of estimating the error probability of an area, colored or not, of at least one mark being confused with an area, not colored or colored with a different color, according to a marking parameter value utilized by the marking means and a step of selecting a value for each parameter corresponding to a probability comprised between two predefined values, preferably surrounding the value of 22%.

The DAC is integrated into the figurative image according to the method specific to the DAC (see above). For example, if a set of positions is predefined by a key, the depth and/or the surface of the area to be embossed corresponding to the value that one wishes to assign locally are varied in these positions. For a signal modulated in a binary way, the two possible values of surface are determined beforehand.

Detection is performed as it is done currently for DACs from digitized images. However, digitization can be done in a way adapted to the watermark capture. For example, a flatbed scanner can be used in transparency scan mode. It is noted that it may be necessary to inverse the image. More accurate measurements of the surface can be made using tools such as an electron microscope.

In variants:

- the methods described above are extended to multi-level signals, even continuous signals,
- the DAC is generated by the duplex printing method described in U.S. Pat. No. 7,286,682. In this example, the local phase variations are modulated to be within the order of magnitude of natural variations in positioning the print. For example, if this variation is more or less 100 microns, a watermark simulation of this magnitude is created, so as to obtain a natural degradation of the watermark,
- DACs are generated with different degradation rates, for example by varying the cell size. The ratio of the degradation rates then gives an indicator of the nature (original or copy) of the DAC. An indicator is therefore obtained that is more robust in cases of aging or wear.
- printed references are used to locate the DAC in the watermark, so that the positioning is more accurate.

The invention claimed is:

1. A method for securing a document, that comprises:

- a first step of printing a first mark on a first surface of said document by utilizing a first printer,
- a second step of printing a second mark on another surface of said document or in the depth of said document by utilizing a second printer,
- the two marks are superimposed, and
- at least one of said marks presents, as a result of ad-hoc unpredictable printing phenomena of its printer, a rate of ad-hoc errors that is greater than a first predefined value,
- wherein at least one of said marks is a mark whose copy, made using a printer identical to the printer utilized for printing said mark and using a same resolution, causes an error rate, measured dot by dot, that is greater than a second predefined value.

2. A method according to claim 1, which comprises a step of estimating an error probability of an area, colored or not, of at least one mark being confused with an area, not colored or colored with a different color, according to a printer parameter value utilized by the printer and a step of selecting a printer parameter value corresponding to the error probability comprised between a third and a fourth predefined values.

3. A method according to claim 2, wherein the third and fourth predefined values surround the value of 22%.

4. A method according to claim 1, wherein at least one of the marks bears an identifier of the document, in a coded way, with redundancies.

5. A method according to claim 1, wherein the marks have complementary colors.

6. A method according to claim 1, wherein at least one of the marks comprises hatched cells.

7. A method according to claim 1, wherein each colored element of one of the marks is superimposed on an absence of marking in the other mark, with the exception of elements that present an absence of marking in both marks and represent a coded message.

8. A method according to claim 1, wherein the marks are formed of a matrix of rectangular areas, one of the marks, when seen by transparency, being formed of colored areas that are superimposed on the centers of uncolored areas in the other mark.

9. A device for securing a document, that comprises:

- a first printer for printing a first mark on a first surface of said document,
- a second printer for printing a second mark on another surface of said document or in the depth of said document, said printers are designed such that the two marks are superimposed, and at least one of said printer is designed such that at least one of said mark presents, as a result of ad-hoc unpredictable printing phenomena of its printer, a rate of ad-hoc errors that is greater than a first predefined value, wherein at least one of said printers is designed to form a mark whose copy, made using a printer identical to the printer utilized for printing said mark and using a same resolution, causes an error rate, measured dot by dot, that is greater than a second predefined value.

10. A partially transparent thin object, that comprises:

a first mark on a first surface of a document, and a second mark on another surface of the document or in the depth of the document, superimposed on the first mark, at least one of said marks presenting, as a result of ad-hoc unpredictable printing phenomena of a printer that formed it, a rate of ad-hoc errors that is greater than a first predefined value, wherein at least one of said marks is a mark whose copy, made using a printer identical to the printer utilized for printing said mark and using a same resolution, causes an error rate, measured dot by dot, that is greater than a second predefined value.

11. An object according to claim 10, wherein at least one of the marks bears an identifier of the document, in a coded way, with redundancies.

12. An object according to claim 10, wherein the marks have complementary colors.

13. An object according claim 10, wherein at least one of the marks comprises hatched cells.

14. An object according to claim 10, wherein each colored element of one of the marks is superimposed on an absence of marking in the other mark, with the exception of elements that present an absence of marking in both marks and represent a coded message.

15. An object according to claim 10, wherein the marks are formed of a matrix of rectangular areas, one of the marks, when seen by transparency, being formed of colored areas that are superimposed on the centers of uncolored areas in the other mark.

* * * * *